May 2, 1933.  A. O. FORSTER ET AL  1,906,256
POULTRY NEST
Filed Aug. 1, 1928    2 Sheets-Sheet 1

INVENTOR.
ALBERT O. FORSTER.
PERCY M. FORSTER.
BY
ATTORNEYS.

May 2, 1933.  A. O. FORSTER ET AL  1,906,256
POULTRY NEST
Filed Aug. 1, 1928   2 Sheets-Sheet 2
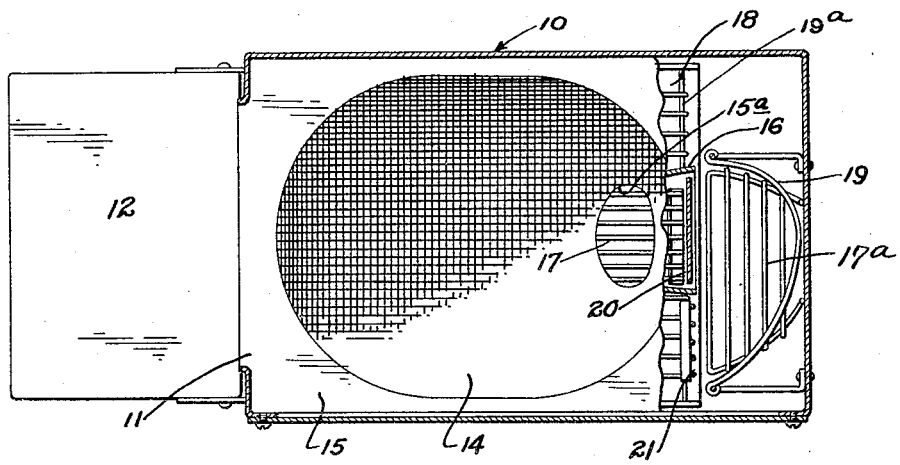
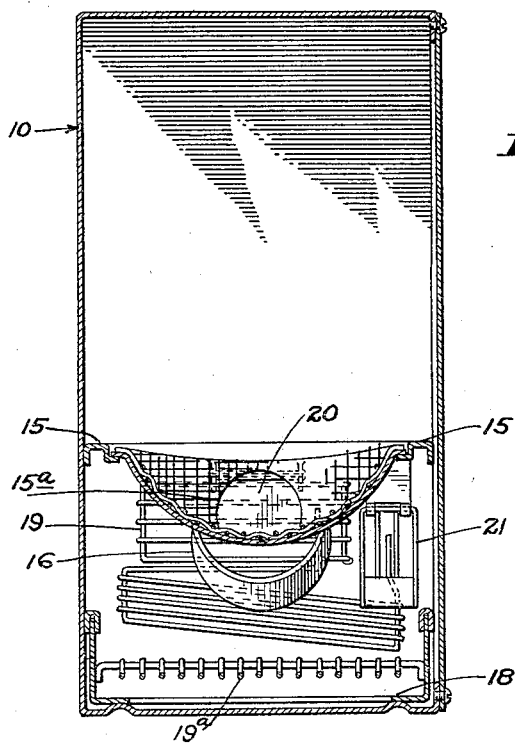
INVENTOR.
ALBERT O. FORSTER.
PERCY M. FORSTER.
BY
ATTORNEYS.

Patented May 2, 1933

1,906,256

UNITED STATES PATENT OFFICE

ALBERT O. FORSTER AND PERCY M. FORSTER, OF BERKELEY, CALIFORNIA, ASSIGNORS OF ONE-FOURTH TO THOMAS I. FORSTER AND ONE-FOURTH TO TONY L. KELLY, BOTH OF BERKELEY, CALIFORNIA

POULTRY NEST

Application filed August 1, 1928. Serial No. 296,654.

This invention relates to poultry nests.

Hitherto it has been necessary to clean the majority of eggs collected from a poultry yard due to their becoming soiled in the nest.

It is the principal object of the present invention to eliminate the necessity for cleaning eggs by providing a simple and inexpensive nest designed to prevent eggs deposited therein from becoming soiled.

One form which the invention may assume is exemplified in the following description and illustrated by way of example in the accompanying drawings, in which:

Fig. 3 is a view in transverse section taken on line 3—3 of Fig. 1.

Fig. 4 is a view in section taken on line 4—4 of Fig. 1.

Figure 1:
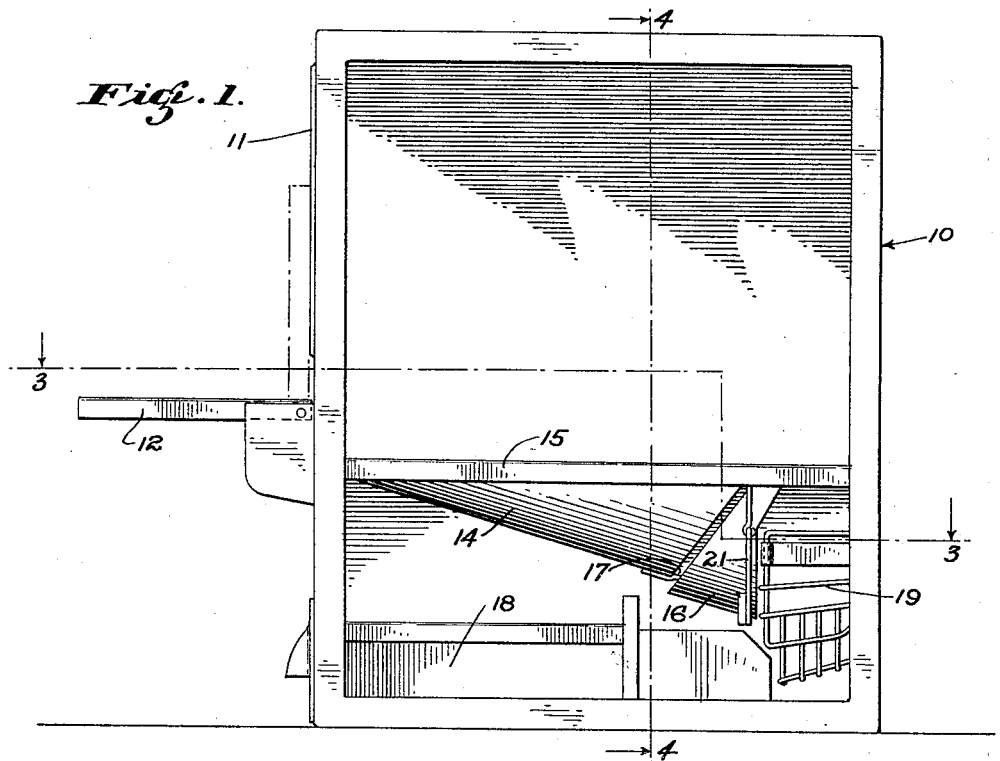
Fig. 1 is a view in side elevation of the nest construction with the side of the housing removed.
Figure 2:
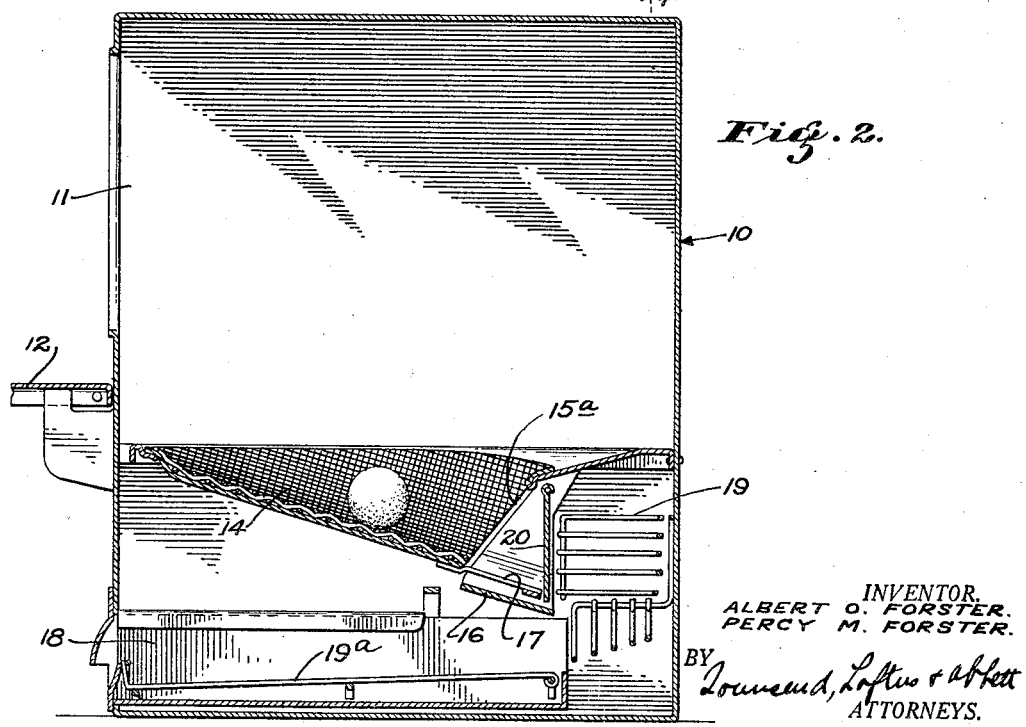
Fig. 2 is a view in central vertical section thru the nest.

Referring more particularly to the accompanying drawings, 10 indicates a nest housing constructed of sheet metal or any other preferred material. At one end this housing is formed with an entry opening 11 of sufficient dimensions to permit a hen to enter the housing. Contiguous to the bottom of the entry opening 11 is a platform 12 which projects outwardly. This platform 12 is hinged at its inner end to the housing so that it may be folded flat against the housing as shown in dotted lines in the drawings.

Disposed horizontally in the housing on a plane just below the bottom of the entry opening is a nest 14. This nest is composed of a flat metal nest frame 15 fixed to the sides of the housing and the nest proper which is fixed within the open central portion of the frame. The bottom of the nest slopes downwardly toward the end of the housing opposite the entry opening. This latter end of the nest is formed with a circular opening 15a.

A chute 16 having a bottom 17 is fixed to the nest in alignment with the opening 15a to direct eggs deposited in the nest to a resilient transfer platform 17a. It will be noticed that this platform slopes both transversely and longitudinally of the housing so that eggs passing thru the chute 16 will be deposited on the platform, then travel transversely out of alignment with the chute and then roll off the platform on to an egg receiving drawer 18 beneath the nest. This drawer 18 extends inwardly from the front wall of the housing 10 so that it may be withdrawn from the housing 10 and the eggs removed.

To assist in directing the eggs during their travel from the chute 16 to the drawer 18 a semi-circular guard 19 is arranged about the rear side of the platform to guide the eggs from the chute 16 to the drawer 18.

It is intended to retard the rolling movement of the eggs from the nest to the drawer 18 so that they will be deposited on the platform 17a and on the drawer 18 gently. This is accomplished by providing swinging members 20 and 21 at the end of the chute 16 and intermediate the transfer platform 17a and the drawer. These swinging members are hinged at their upper ends to the nest frame 15 so that they may swing out of the line of travel of the eggs. Contact with these swinging members 20 and 21 causes the movement of the eggs to be retarded and results in the eggs being deposited gently on the platform 17a and the drawer 18.

One of the principal features of the present invention is the construction of certain parts which prevents the eggs from becoming soiled. Reference being had to the drawings it will be noticed that the bottom of the chute 16 is formed of spaced wires over which the eggs roll upon discharging from the nest. Likewise, the platform 17a and the guard 19 are formed of spaced wires. This construction prevents the accumulation of any foreign matter on the parts over which the eggs travel and results in keeping the eggs clean. It is also desired to point out that the drawer 18 is formed with a false bottom 19a constructed of longitudinal wires fixed at spaced distances apart.

In operation of the device, when an egg is deposited in the nest it will roll downwardly thru the chute 16 and be deposited on the transfer platform 17a which is as shown of resilient construction so as to cushion the depositing of an egg thereon. As this platform slopes both transversely and longitudinally of the housing, the egg will roll clear of the chute and be directed by the guard to the drawer 18. During its travel the egg will encounter the swinging members 20 and 21 and its movement will be retarded so that it will be deposited on the platform and the drawer gently. As the parts over which the eggs roll are all of spaced wire construction, the eggs will be kept entirely free from foreign matter.

While we have shown the preferred form of our invention, it is to be understood that various changes in its construction may be made by those skilled in the art without departing from the invention as defined in the appended claim.

Having thus described our invention, what we claim and desire to secure by Letters Patent is:

A poultry nest comprising a housing having an entry opening, a nest mounted within the housing, an egg receiving drawer mounted within the housing beneath the nest, said drawer being removable from the housing, said nest having an opening formed therein, a chute fixed to the nest in alignment with the opening, a platform within the housing contiguous to the end of said chute whereby eggs passing through the chute will be deposited on the platform, said platform sloping both transversely and longitudinally of the housing so that eggs deposited on the platform will travel transversely out of alignment with the chute and then longitudinally to be deposited in the drawer, guide means above the platform for guiding the egg during its travel, a hinged member suspended within the chute to retard movement of an egg from the nest to the platform, and a hinged member in the housing between the platform and the drawer to retard the passage of an egg from the platform to the drawer.

ALBERT O. FORSTER.
PERCY M. FORSTER.